United States Patent [19]

Gill et al.

[11] Patent Number: 5,124,368

[45] Date of Patent: Jun. 23, 1992

[54] POUR-IN-PLACE FLEXIBLE POLYURETHANE FOAM ARTICLES

[75] Inventors: William A. Gill, Hurricane; Siusun K. Leung, Charleston, both of W. Va.

[73] Assignee: ARCO Chemical Technology, L.P., Wilmington, Del.

[21] Appl. No.: 737,106

[22] Filed: Jul. 29, 1991

[51] Int. Cl.$^5$ .............................................. C08G 18/14
[52] U.S. Cl. ................................... 521/111; 521/112; 264/45.1; 264/46.4; 264/46.6
[58] Field of Search ............... 521/111, 112; 264/45.1, 264/46.4, 46.6

[56] References Cited

U.S. PATENT DOCUMENTS 4,883,825  11/1989  Westfall et al. .................... 521/112

Primary Examiner—Maurice J. Welsh
Attorney, Agent, or Firm—David L. Mossman

[57] ABSTRACT

It has been discovered that a particular polyurethane formulation may be used to prepare "pour-in-place" (PIP) polyurethane foam articles where the formulation is injected into a mold bearing an exterior covering such as a fabric without the foaming liquid striking through the layer. The formulation employs a hydrophilic polyhydric compound to help the reactivity balance that minimizes penetration of the exterior covering while also stabilizing the rising foam against shear collapse without excessively tightening the foam. Contrary to the conventional expectation that the hydrophilic polyhydric compound would cause strike through problems since it delays the initial reaction time, it has been found to have the noted stabilizing effect. A preferred hydrophilic polyhydric compound is glycerine. A preferred isocyanate for the formulation is tolylene diisocyanate (TDI), in contrast to diphenylmethane diisocyanate (MDI) heretofore used in PIP foams.

22 Claims, No Drawings

POUR-IN-PLACE FLEXIBLE POLYURETHANE FOAM ARTICLES

FIELD OF THE INVENTION

The invention relates to pour-in-place flexible polyurethane foam formulations, and in one aspect more particularly concerns formulations for pour-in-place polyurethane foams which have reduced incidence of striking through the outer later and which do not require a barrier film.

BACKGROUND OF THE INVENTION

A continuing goal of the foamed resin or polyurethane industry is to reduce manufacturing costs. One approach that is being actively used commercially, as well as a subject of ongoing research and development is called "pour-in-place" technology. In this endeavor, the urethane foaming mixture is poured into a mold containing an upholstery material or outer layer, such as rayon, vinyl, treated natural fibers and the like. A major problem with this approach is that the reacting liquid urethane mixture can strike through or penetrate the upholstery material while the latter is conforming to the shape of the mold, and thus the shape of the desired composite article.

"Strike-through" is a problem because the reacting polyurethane mixture is poured inside the upholstery where the foaming action moves it, under pressure, toward the walls of the mold. Because of the pressure exerted on the upholstery, the urethane mixture is prone to penetrate the upholstery material and result in a defective article. Often a thin foam barrier is used in place between the foam and the upholstery. However, penetration of the foam barrier is also not preferred since even though such strike through is not visible, there is harsh feeling to the touch at the point of penetration.

Ideal pour-in-place (PIP) foams must have (1) no strike through of the fabric since this produces a defective article; (2) minimal penetration into the foam backing, preferably less than 50% of the thickness, otherwise a harsh feeling will result; and (3) no shrinkage so that the size of the article is as full as intended. In addition, there are a number of characteristics which are desirable for the PIP foam to have, namely, (4) low weight; (5) no use of chlorofluorocarbons (CFCs); (6) low cost and design flexibility; and (7) fast cure so that handling and production are easier.

A number of approaches have been developed to address the strike-through of PIP polyurethane foam systems. For example, the use of diphenylmethane diisocyanate (MDI) as the isocyanate gives foams with high initial reactivity (fast cure) and which build viscosity quickly, but such systems require chlorofluorocarbons to achieve economically viable part weights (low density) and softness. Higher catalyst contents give fast cures and minimizes penetration of the fabric, but cause shrinkage and deterioration of physical properties. Use of a thicker foam barrier stops strike through and eliminates harsh feeling, but is more costly and limits design flexibility. Another technique is to use a physical barrier film as part of the covering. This barrier film is sometimes termed a trilaminate, since the outer layer or upholstery and the thin polyurethane foam backing are counted as the other laminate layers. However trilaminate barrier films are also costly and the articles in which they are used lose breathability.

It would be advantageous if a pour-in-place polyurethane formulation could be found which did not require the use of halocarbons as blowing agents, but which did not otherwise suffer in properties from the absence of such agents. Indeed, it would be helpful to discover a PIP technology which did not require MDI as the sole polyisocyanate and/or which did not require the use of a barrier film.

SUMMARY OF THE INVENTION

Accordingly, it is an object of the present invention to provide a process for the manufacture of composite articles that comprise an exterior bilaminate covering and a flexible polyurethane core with reduced penetration or strike-through by the reacting polyurethane through the bilaminate covering, which may be comprised of an upholstery material.

It is another object of the present invention to provide a process for the manufacture of pour-in-place composite articles having a lower weight and density, without the use of chlorofluorocarbons (CFCs), and with fast demold times.

Still another object of the present invention is to provide a formulation for pour-in-place polyurethane foams that would obviate the need for a barrier film, but which could be used in conjunction with a barrier film, if desired.

A unique composition that can be used for PIP applications and which delivers the needed and desired utilities for PIP articles as described above has been discovered. The polyurethane formulations found to the useful in this invention are similar to those used in U.S. Pat. No. 4,883,825, which relate to the manufacture of low density, flexible polyurethane foams using a catalyzed reaction of a highly reactive, high ethylene oxide, high functionality polyol, a hydrophilic polyhydric compound, water and polyisocyanates. Pour-in-place, bilaminate and trilaminate compositions are not taught nor suggested by this patent. Indeed, U.S. Pat. No. 4,883,825 teaches a foam formulation which slows down the reaction time and is thus expected to cause strike through problems, were it to be used in a PIP application. Furthermore, as noted, commercial PIP technology uses exclusively MDI to deliver the needed strike through and cure performance and is generally believed to be the viable isocyanate. Surprisingly, the composition of this invention can be used with tolylene diisocyanate (TDI) or MDI. TDI may be used to achieve a lower density foam without CFCs.

In carrying out these and other objects of the invention, there is provided, in one form, a process for the manufacture of a poured-in-place composite article having an exterior covering and a flexible polyurethane foam core involving the steps of first, containing the exterior covering in a shaped mold, where the exterior covering is an upholstery material; second, injecting into the shaped mold inside the exterior covering fluid reacting intermediates; and third, reacting together the fluid reacting intermediates which expand to conform the composite article to the shape of the shaped mold. The fluid reacting intermediates are at least six: (a) a polyether polyol having a nominal functionality of at least three, a primary hydroxyl content of at least 75 percent, and an ethylene oxide content of from 8 to 30 percent of the polyether polyol; (b) 0.1 to 10 parts per hundred parts (pphp) of polyol of a polyhydric material selected from the group consisting of glycerine, trimethylolpropane, sorbitol, erythritol, sucrose, simple carbohydrates, and mixtures thereof, said polyhydric material also being sufficiently hydrophilic so as to be at least 40 weight percent soluble in water at 25° C.; (c) water in an amount of less than or equal to 20 pphp of polyol; (d) an organic polyisocyanate; (e) at least one catalyst for the reaction of the polyether polyol with the organic polyisocyanate; and (f) a silicon stabilizer.

DETAILED DESCRIPTION OF THE INVENTION

It has been discovered that low density, flexible polyurethane foam formulations that are based on highly reactive polyols and hydrophilic materials such as glycerine do not strike through the bilaminate in pour-in-place (PIP) foams as would be expected, even though such formulations were designed to retard initial reactions. Such formulations are described in U.S. Pat. No. 4,883,825 which is incorporated herein by reference. The process of this invention substantially eliminates the need for trilaminate or barrier film coverings where the third laminate is a costly layer. However, the use of these formulations does not preclude such a trilaminate which may be employed, if desired.

That is, the present invention provides a process for the manufacture of composite articles that have an exterior bilaminate covering and a flexible polyurethane core. The articles are commercially attractive, such as automobile head rests, seats, etc. In addition, the technology is useful and promising for molded furniture and bedding. In the process, the bilaminate structure is an upholstery material with an optional flexible urethane foam backing contained in a shaped mold into which high resilience urethane foaming materials are poured and expanded to conform to the shape of the desired article. Such thin flexible urethane foam backing layers may be composed of any suitable and compatible polyurethane foam, and may have a thickness ranging from about 1 to about 25 mm, as an example only.

The high resilience foaming materials of this invention are based on (a) high reactivity, high ethylene oxide content, high functionality polyols, (b) hydrophilic polyhydric compounds, (c) water less than or equal to about 20 pphp of polyol, (d) organic polyisocyanates, and (e) catalysts for the reaction of the above components. Optionally but preferably, (f) surfactants are present for the stabilization of the resulting foam core.

The pour-in-place composite articles made using the formulations of this invention using a hydrophilic polyhydric compound have reduced barrier penetration as compared with articles made from formulations without the hydrophilic polyhydric compound. This is particularly true when a process/foam modifier is included. The hydrophilic polyhydric compound also stabilizes the rising foam core against shear collapse without excessively tightening the foam, as compared with articles using foams without the hydrophilic polyhydric compound, again especially when also using a process/foam modifier.

Polyol

The polyol, or blends thereof, employed herein depends upon the end use of the polyurethane foam to be produced. The molecular weight or hydroxyl number of the polyol is selected so as to result in flexible foams when the polyol is converted to a polyurethane. For the purpose of the present invention the polyol is characterized by having at least 75 percent, and preferably 85 percent, primary hydroxyl groups as measured by ASTM D-4273. The hydroxyl number of the polyol employed can accordingly vary over a wide range. In general, the hydroxyl number of the polyol employed may range from about 20 (or lower) to about 70 (and higher). As a further refinement, the specific foam application will likewise influence the choice of the polyol. As an example, for the molded foams anticipated by this invention, the hydroxyl number of the polyol may be on the order of about 20 to about 70.

The hydroxyl number limits described above are not intended to be restrictive, but are merely illustrative of the larger number of possible combinations for the polyols used.

The hydroxyl number is defined as the number of milligrams of potassium hydroxide required for the complete hydrolysis of the fully phthalated derivative prepared from one gram of polyol. The hydroxyl number can also be defined by the equation:

$$OH = \frac{(56.1 \times 1000 \times f)}{m.w.}$$

where
OH = hydroxyl number of the polyol;
f = functionality, that is, average number of hydroxyl groups per molecule of polyol; and
m.w. = number average molecular weight of the polyol.

Substantially any of the polyols previously used in the art to make polyurethanes can be used as the polyol in this invention. Illustrative of the polyols useful in producing polyurethanes in accordance with this invention are the polyhydroxyalkanes, the polyoxyalkylene polyols or the like. Among the polyols which can be employed are those selected from one or more of the following classes of compositions, alone or in admixture, known to those skilled in the polyurethane art:

(a) alkylene oxide adducts of polyhydroxyalkanes;
(b) alkylene oxide adducts of nonreducing sugars and sugar derivatives;
(c) alkylene oxide adducts of phosphorus and polyphosphorus acids; and
(d) alkylene oxide adducts of polyphenols.

Illustrative alkylene oxide adducts of polyhydroxyalkanes include, among others, the alkylene oxide adducts of glycerine; 1,2,4-trihydroxybutane; 1,2,6-trihydroxhexane; 1,1,1-trimethylolethane; 1,1,1-trimethylolpropane; pentaerythritol; polycaprolactone; xylitol; arabitol; sorbitol; mannitol and the like.

A further class of polyols which can be employed are the alkylene oxide adducts of the nonreducing sugars, wherein the alkylene oxides have from 2 to 4 carbon atoms. Among the nonreducing sugars and sugar derivatives contemplated are sucrose; alkyl glycosides such as methyl glucoside; ethyl glucoside and the like; glycol glycosides such as ethylene glycol glucoside; propylene glycol glycoside; glycerol glucoside; 1,2,6-hexanetriol glucoside and the like, as well as the alkylene oxide adducts of the alkyl glycosides as set forth in U.S. Pat. No. 3,073,788, incorporated by reference herein.

A still further useful class of polyols is the polyphenols, and preferably the alkylene oxide adducts thereof wherein the alkylene oxides have from 2 to 4 carbon atoms. Among the polyphenols which are contemplated are, for example, condensation products of phenol and formaldehyde, and novolac resins; condensation products of various phenolic compounds and acrolein; the simplest member of this class being 1,2,3-tris(hydroxyphenyl)propane, condensation products of various phenolic compounds and glyoxal, glutaraldehyde, and other dialdehydes, the simplest members of this class being the 1,1,2,2-tetrakis(hydroxyphenol)ethanes and the like.

The alkylene oxide adducts of phosphorus and polyphosphorus acids are another useful class of polyols. Ethylene oxide; 1,2-epoxypropane; the epoxybutanes, 3-chloro-1,2-epoxypropane and the like are preferred alkylene oxides. Phosphoric acid, phosphorus acid, the polyphosphoric acids such as tripolyphosphoric acid, the polymeta phosphoric acids and the like are desirable for use in this connection.

Indeed, any material having an active hydrogen as determined by the Zerewitinoff test may be utilized as the polyol also known as "polyahls". For example, amine-terminated polyether polyols are known and may be utilized, if desired.

The most preferred polyols employed in this invention include the poly(oxypropylene) glycols, triols and higher functionality polyols, and the like that are capped with ethylene oxide as dictated by the reactivity requirements of the particular polyurethane application. Generally, the nominal functionality of such polyols will be in the range of about 3 to 5 or more. These polyols also include poly(oxypropylene oxyethylene) polyols; however, desirably, the oxyethylene content should comprise less than 80 percent of the total polymer and preferably less than 60 percent. The ethylene oxide, when used, can be incorporated in any fashion along the polymer chain. Stated another way, the ethylene oxide can be incorporated either in internal blocks, as terminal blocks, or may be randomly distributed along the polyol chain. In total, the ethylene oxide content should be from 8 to 30 percent of the total polymer.

In addition to these conventional polyols, polymer polyols may be used alone or blended with other polyols. Polymer polyols are well known in the art. The basic patents in the field are Stamberger Re. 28,715 (reissue of U.S. Pat. No. 3,383,351); Re. 29,118 (reissue of U.S. Pat. No. 3,304,273); and the like, incorporated herein by reference. Such compositions can be produced by polymerizing one or more ethylenically unsaturated monomer dissolved or dispersed in a polyol in the presence of a free radical catalyst to form a stable dispersion of polymer particles in the polyol. These polymer polyol compositions have the valuable property of imparting to polyurethane foams produced therefrom higher load-bearing properties than are provided by the corresponding unmodified polyols. Also included are the polyols of the type taught in U.S. Pat. Nos. 3,325,421 and 4,374,209, incorporated herein by reference.

Conceptually, a wide variety of monomers may be utilized in the preparation of the polymer polyol compositions in accordance with the invention. Numerous ethylenically unsaturated monomers are disclosed in the prior patents. Any of these monomers should be suitable.

The selection of the monomer or monomers used will depend on considerations such as the relative cost of the monomers and the polyurethane product characteristics required for the intended application. To impart the desired load-bearing to the foams, the monomer or monomers used in preparing the polymer polyol should, of course, desirably be selected to provide a polymer which has a glass transition of at least slightly higher than room temperature. Exemplary monomers include styrene and its derivatives such as para-methylstyrene, methacrylates such as methyl methacrylate, acrylonitrile and other nitrile derivatives such as methacrylonitrile and the like. Vinylidene chloride may also be employed.

The preferred monomer mixtures used to make the polymer polyol compositions are mixtures of acrylonitrile and styrene or acrylonitrile, styrene and vinylidene chloride.

The monomer content will be typically selected to provide the desired solids content required for the anticipated end-use application. In general, it will usually be desirable to form the polymer polyols with as high a resulting polymer or solids contents as will provide the desired viscosity and stability properties.

For typical high resilience (HR) foam formulations, solids content of up to about 45 weight percent or more are feasible and may be provided.

Hydrophilic Polyhydric Materials

The use of polyhydric materials is primarily intended to delay the blowing reaction and to stabilize the foam. They should be very hydrophilic in nature and soluble in water at 25° C. to the extent of at least about 40% by weight, more preferably they should be completely soluble. The polyhydric compounds should be reactive towards the isocyanate radical. Suitable materials include glycerine, trimethylolpropane, sorbitol, erythritol, sucrose, simple carbohydrates such as glucose and fructose, an low molecular weight polyethylene oxide polyols. Most preferably glycerine is employed. The amount of the polyhydric material employed can range from 0.1 to 10 parts per hundred parts (pphp) of the polyether polyol, preferably from 0.5 to 6 pphp and most preferably from about 1.5 to 3.5 pphp. These materials should be reactive with isocyanate groups, but should not be more reactive with an isocyanate group than are the primary hydroxyl groups of the polyether polyol.

Glycerine was found to have unique and unexpected utility in the preparation of TDI-based polyurethane foams for pour-in-place (PIP) or foam-in-fabric applications; it is expected that other hydrophilic polyhydric materials would give similar results. In studies conducted on an Admiral high pressure foam machine, it was determined that the addition of glycerine enhanced foam firmness, compression set properties and green strength as expected because of enhanced crosslinking. However, it was also discovered that glycerine appears to make unique contributions to the reactivity balance that helps minimize penetration of barrier foams while also stabilizing the rising foam against shear collapse and performing all of these functions without excessively tightening the foam.

Catalysts

Any known catalysts useful in producing polyurethanes may be employed. Representative catalysts include, but are not limited to:

(a) tertiary amines such as bis(2,2'-dimethylamine)ethylether, trimethylamine; triethylamine; N-methylmorpholine; N-ethylmorpholine; N,N-dimethylbenzylamine; N,N-dimethylethanolamine; N,N',N'-tetramethyl-1,3-butanediamine; N,N-dimethylpiperazine; 1,4-diazobicyclo[2.2.2]octane; triethylenediamine; pentamethyldipropylenetriamine, triethanolamine, pyridine oxide and the like;

(b) strong bases, such as alkali and alkaline earth metal hydroxides; alkoxides; and phenoxides;

(c) acidic metal salts of strong acids, such as ferric chloride; stannic chloride; stannous chloride; antimony trichloride; bismuth nitrate and chloride; and the like;

(d) chelates of various metals such as those which can be obtained from acetylacetone; benzoylacetone; trifluoroacetyl acetone; ethyl acetoacetate; salicyclaldehyde; cyclopentanone-1-carboxylate; acetylacetoimine; bisacetylacetonealkylenediamine; salicylaldehydeimine; and the like, with various metals such as Be, Mg, Zn, Cd, Pd, Ti, Zr, Sn, As, Bi, Cr, Mo, Mn, Fe, Co, and Ni or such ions as $MoO_2^{++}$, $UO_2^{++}$ and the like;

(e) tertiary phosphines such as trialkylphosphines; dialkylbenzylphosphines, and the like;

(f) alcoholates and phenolates of various metals, such as $Ti(OR)_4$; $Sn(OR)_4$; $Sn(OR)_2$; $Al(OR)_3$; and the like, wherein R is alkyl or aryl, and the reaction products of alcoholates with carboxylic acids, $\beta$-diketones, and 2-(N,N-dialkylamino)alcohols, such as the well known chelates of titanium obtained by said or equivalent procedures;

(g) salts of organic acids with a variety of metals, such as alkali metals, alkaline earth metals, Al, Sn, Pb, Mn, Co, Bi and Cu, including, for example, sodium acetate, potassium laurate, calcium hexanoate, stannous acetate, stannous octoate, stannous oleate, lead octoate, metallic driers such as manganese and cobalt naphthenate, and the like; and (h) organometallic derivatives of tetravalent tin, trivalent and pentavalent As, Sb, and Bi and metal carbonyls of iron and cobalt.

Among the organotin compounds that deserve particular mention are dialkyltin salts of carboxylic acids, e.g., dibutyltin diacetate, dibutyltin dilaureate, dibutyltin maleate, dilauryltin diacetate, dioctyltin diacetate, dibutyltin-bis(4-methylaminobenzoate), dibutyltindilaurylmercaptide, dibutyltin bis(6-methylaminocaproate), and the like. Similarly, there may be used a trialkyltin hydroxide, dialkyltin oxide, dialkyltin dialkoxide, or dialkyltin dichloride. Examples of these compounds include, but are not limited to, trimethyltin hydroxide, tributyltin hydroxide, trioctyltin hydroxide, dibutyltin oxide, dioctyltin oxide, dilauryltin oxide, dibutyltin-bis-(isopropoxide), dibutyltin-bis(2-dimethylaminopentylate), dibutyltin dichloride, dioctyltin dichloride and the like.

The catalysts are employed in small amounts, for example, from about 0.001 percent to about 5 percent, based on the weight of the reaction mixture.

Blowing Agents

A small amount of a blowing agent other than water may be employed in the reaction mixture, but may also be omitted. Water should be used in an amount from about 0.5 to 20, preferably 1.5 to 5 and most preferably 2.5 to 3.5, parts of water per hundred parts of polyol. A combination of water and other blowing agents may include halogenated hydrocarbons such as trichloromonofluoromethane; dichlorodifluoromethane; dichloromonofluoromethane; dichloromethane; trichloromethane; 1,1-dichloro-1-fluoroethane; 1,1,2-trichloro-1,2,2-trifluoroethane; hexafluorocyclobutane; octafluorocyclobutane, and the like. However, as noted, it is preferred in most embodiments to avoid the use of halocarbon blowing agents completely. Another class of blowing agents include thermally unstable compounds which liberate gases upon heating such as N,N'-dimethyl-N,N'-dinitrosoterephthalamide, amine formates, formic acid and the like. The quantity of blowing agent employed will vary with factors such as the density desired in the foamed product.

Stabilizers

It is also within the scope of the invention to employ, when applicable, small amounts, e.g. about 0.001 percent to 5.0 percent by weight, based on the total reaction mixture, of a foam stabilizer. Suitable foam stabilizers or surfactants are known and may vary depending upon the particular polyurethane application. A class of suitable copolymers includes those where the polysiloxane moiety is bonded to the polyoxy-alkylene moiety through direct carbon-to-silicon bonds, rather than through carbon-to-oxygen-to-silicon bonds. These various polysiloxane-polyoxyalkylene block copolymers preferably contain from 5 to 50 weight percent of polysiloxane polymer, with the remainder being polyoxyalkylene polymer. Yet another useful class of foam stabilizer is composed of the cyanoalkyl-polysiloxanes described in U.S. Pat. No. 3,905,924 useful as high resiliency (HR) foam stabilizers. Generally the stabilizers suitable for use in accordance with this invention will be referred to as silicon stabilizers.

Polyisocyanates

The organic polyisocyanates that are useful in producing polyurethane foam in accordance with this invention are organic compounds that contain at least two isocyanato groups. Such compounds are well-known in the art. Suitable organic polyisocyanates include the hydrocarbon diisocyanates (e.g. the alkylene diisocyanates and the arylene diisocyanates), as well as known triisocyanates and polymethylene poly(phenylene isocyanates). Non-limiting examples of suitable polyisocyanates are 2,4-diisocyanatotoluene; 2,6-diisocyanatotoluene; methylene bis(4-cyclohexyl isocyanate); 1,8-diisocyanatooctane; 1,5-diisocyanato-2,2,4-trimethylpentane; 1,9-diisocyanatononane; 1,10-diisocyanatopropylether of 1,4-butylene glycol; 1,11-diisocyanatoundecane; 1,12-diisocyanatododecane bis-(isocyanatohexyl)sulfide; 1,4-diisocyanatobenzene; 3,5-diisocyanato-o-xylene; 4,6-diisocyanato-m-xylene; 2,6-diisocyanato-p-xylene; 2,4-diisocyanato-1-chlorobenzene; 2,4-diisocyanato-1-nitrobenzene; 2,5-diisocyanato-1-nitrobenzene; 4,4'-diphenylmethylene diisocyanate; 2,4'-diphenylmethylene diisocyanate; and polymethylene poly(phenyleneisocyanates) and mixtures thereof. The preferred polyisocyanates are TDI (a mixture of 80% 2,4-tolylene diisocyanate and 20% 2,6-tolylene diisocyanate), MDI (diphenylmethane diisocyanate alone or in mixture with its polymeric forms), and mixtures of TDI with MDI.

The isocyanate index for the PIP foams of this invention may range from about 50 to about 140.

Crosslinkers/Chain Extenders

Also useful, though optional, in the invention are crosslinkers/chain extenders. The proportion levels are in the range of 0.1 to 10 pphp of polyol, preferably 0.5 to 6.0 pphp polyol, and most preferably 1.5 to 3.5 pphp polyether polyol.

Suitable crosslinking/chain extending agents are those materials which are reactive with isocyanate groups, particularly compounds having hydroxyl and/or primary or secondary amine groups and include: (1) crosslinking compounds of an equivalent weight of less than about 200; and/or (2) difunctional extender compounds, other than those having only secondary hydroxyl groups, of equivalent weight of less than about 200. Preferably, the crosslinking/extending agent has a nominal functionality in the range of 2 to about 8.

A low molecular weight polyfunctional glycolamine crosslinking/extending agent is preferred to make foams under the conditions of this invention. Diethanolamine (DEOA) is the compound of choice. Blends of other crosslinkers and/or extenders with DEOA can also provide similar advantages.

Though DEOA is preferred, other crosslinking/extending agents such as, by way of non-limiting examples, triethanolamine; diisopropanolamine; ethylene glycol; butanediol; tetraethylenepentamine; polyethyleneimine; the isomers of phenylene diamine; sorbitol; erythritol; sucrose; trimethylolpropane; pentaerythritol; 2,4,6-triaminotoluene; isophorone diamine; diethyl tolylenediamine; ethanolamine; hydrazine; 4,4-methylene-bis-(o-chloroaniline); low molecular weight alkylene oxide, e.g. ethylene oxide and propylene oxide; adducts of polyfunctional amines or alcohols (e.g. polyfunctional glycols); alkylene oxide adducts of polyfunctional aminoalcohols and polyfunctional alcoholamines; amine-terminated polyalkylene oxides and many other low molecular weight polyfunctional hydroxyl and/or amine compounds can be substituted for DEOA, if desired.

Process/Foam Modifiers

Process/foam modifiers are optionally useful in this invention. These are materials which are derivatives of ethylene oxide and are used in the range of about 0.1 to 10 pphp of polyol, preferably about 0.2 to 5 pphp of polyol and most preferably from about 0.5 to 2 pphp polyol.

Polyethylene oxide monols and/or polyols are preferred process/foam modifiers. Suitable polyethylene oxide monol or polyols are those ethylene oxide adducts which contain greater than about 50% ethylene oxide, preferably greater than about 60%, and most preferably greater than about 75% by weight ethylene oxide, and have an equivalent weight ranging from about 150 to about 5000; preferably from 150 to about 1000; and most preferably from about 150 to about 700. The polyethylene oxide preferably has a hydroxyl functionality of two or greater.

Suitable initiators for the process/foam modifiers include, but are not necessarily limited to those discussed as suitable for the polyether polyols in the prior portion of this specification.

The modifier functions as a cell opening agent and modifies the foam reactivity physical properties such as compression sets.

Other Additives

A variety of other additives known to those skilled in the art also may be incorporated in the foam formulations of the process of the present invention in accordance with techniques known in the art. These may include flame retardants, colorants, mineral fillers and other materials.

The polyurethanes so produced may be utilized in PIP flexible foam applications where any otherwise conventional type of flexible polyurethane is or can be used. The polyurethanes find particular utility in the high resiliency foams poured-in-place for arm rests, automobile seats, and the like.

Whereas the exact scope of the instant invention is set forth in the appended claims, the following specific examples illustrate certain aspects of the present invention and, more particularly, point out methods of evaluating the same. However, the examples are set forth for illustration only and are not to be construed as limitations on the present invention, except as set forth in the appended claims. All parts and percentages are by weight unless otherwise indicated.

Definitions

As used in the Examples, the following designations, symbols, terms and abbreviations have the following meanings:

| | |
|---|---|
| A-1 | A catalyst solution consisting of 70 weight percent bis(2-dimethylaminoethyl)ether and 30 weight percent dipropylene glycol made by Union Carbide Chemicals and Plastics Corp. |
| A-33 | A catalyst solution consisting of 33 weight percent triethylenediamine and 67 weight percent dipropylene glycol sold by Union Carbide Chemicals and Plastics Corp. |
| C.F.D. | Compression force deflection as measured under ASTM-3574. |
| DEOA | Diethanolamine. |
| Elongation | Tested using ASTM D-3574. |
| 50% C.S. (CD) | Compression set test when foam compressed 50% using ASTM D-3574. CD refers to the constant deflection measurement technique. |
| H.A.C.S. | Humid aging compression set. |
| Polyol A | A polymer polyol available from AC West Virginia Polyol Company as "E-660" which has a hydroxyl number of about 20. |
| Polyol B | A polyol available from AC West Virginia Polyol Company as "E-644" which has a hydroxyl number of about 28. |
| Tear resistance (strength) | Tested using ASTM D-3574. |
| Tensile str. | Tensile strength tested using ASTM D-3574. |
| Foam modifier A | An ethylene oxide adduct of glycerine having a molecular weight of about 990. |
| Y-10,515 | A silicon surfactant made by Union Carbide Chemicals and Plastics Corp. |

PROCEDURE

All foams were prepared with an Admiral high pressure mixing machine as described in Table I, Section A. Two streams were fed to the high pressure mixing head at rates sufficient to achieve about 25 pounds per minute total throughput. The resin stream contained the polyols, water, crosslinker, catalysts and all other additives while the isocyanate stream comprised only the polyisocyanate. Mixing pressures were 1500 pounds per square inch for each of the two streams. In the case of Examples A, 1 and 2, the stream temperatures were 75° F. and in the case of Examples B, 3, 4 and 5 the stream temperatures were 85° F.

In each example, free rise foams and pour-in-place molded foams were prepared.

Free Rise Foaming (Lilly Tub)—Foam cure rate and tendency of the free rise foam to shrink were evaluated by pouring liquid foam into an open 5-quart plastic lilly tub as described in Table I, Section B. Foam cure was indicated by Tack Free Time, which was the elapsed time after pour that the foam would not adhere to a green nitrile rubber glove (SOL-VEX glove from the Edmont Company). Shrinkage was evaluated by tendency of the free rise foam to wrinkle, pucker and/or pull away from the plastic container. In the case of Examples A, 1 and 2, some selected physical properties measured by ASTM D-3574 methods were determined on the lilly tub free rise foams after a minimum of five days at ambient conditions.

Free Rise Foaming (Cardboard Box)—Foam physical properties for Examples B, 3, 4 and 5 were determined on free rise foams prepared in cardboard boxes as described in Table I, Section C. The relatively large size of the cardboard box, 14 inches by 14 inches by 6 inches, allowed for sufficient quantity of foam to determine tensile and tear strength properties as well as compression sets and firmness by compression force deflection. Properties were determined by ASTM D-3574 methods after a minimum of five days aging at ambient conditions.

Pour-in Fabric Molding—Foam characteristics critical to many current pour-in-place (PIP) applications were evaluated in a customized text block mold fitted with foam-backed fabric. Test conditions are described in Table I, Section D. The test mold was a rectilinear box of 0.5" aluminum plates having outer dimensions of 9"×9"×5" and inner dimensions of 8"×8"×4". A hinged door 3"×6"×0.5" with a 1.25" diameter porthole was present in one of the narrower sides as the lid. The foam-backed fabric was fit snugly to all inner walls of the mold by cutting one piece 4 inches wide by approximately 30 inches long to fit the mold body, leaving a gap at the 1.25 inch porthole for making the liquid pour, and then cutting pieces at least 9 inches by 9 inches to fit against the removable side cover plates. The latter pieces of fabric were held by 0.5" long guide pins, four on each side of the 9"×9" plates facing inside the mold, and formed a rudimentary seal where the side cover plates fit against the mold body. Liquid foam was poured into the fabric cover through the 1.25" porthole in the hinged lid. Individual pours were made to provide a minimum fill and also 10 percent and 15 percent packing levels. Minimum fill was that quantity required to move the expanding foam barely through the uncovered porthole, minus the quantity in the porthole volume itself. The critical features of barrier penetration and foam stability at the barrier interface were evaluated at each packing level. An overall foam stability rating was given for each example. Selected foam physical properties using ASTM D-3574 methods were measured on foam specimens taken from the foam-in-fabric samples after a minimum of 5 days aging at ambient conditions.

TABLE I

| Pour-in-Place Flexible Foam Process Conditions | |
|---|---|
| A. Machine | |
| Type | Admiral High Pressure, Model #500-3HP-L |
| Throughput, Lbs./min. | 25 |
| Number of Streams | 2 |
| Stream Temp., °F. (Resin/Iso) | 75/75 (Examples A, 1 & 2) 85/85 (Examples B, 3, 4 & 5) |
| Mixing Pressures, psi (Resin/Iso) | 1500/1500 |
| B. Free Rise Foaming (Lilly Tub) | |
| Container Type | Plastic lilly tub, high density polyethylene |
| Container Size | 312 in.$^3$ volume (~5 quarts) 7.75" height |
| C. Free Rise Foaming (Cardboard Box) | |
| Container Type | Square cardboard box |
| Container Size | 14" × 14" × 6" With aluminum support 14.25" × 14.25" × 6" |
| D. Pour-in-Fabric Molding | |
| Test Mold Construction | 0.5" thick aluminum, removable side plates, hinged door with 1.25" diameter porthole |
| Test Mold Size | 8" × 8" × 4" I.D. |
| Mold Temperature | Ambient |
| Fabric Trim | Automotive upholstery fabric with 4.5 mm laminated foam backing (foam porosity >115 cFm/ft$^2$) |

POUR-IN-PLACE FLEXIBLE FOAM ARTICLES

EXAMPLES A, 1 AND 2

These Examples illustrate the effect of adding glycerine to compositions based on 55 parts of polyol A and 45 parts of polyol B and containing the foam modifier A at loadings of 0.5 to 1.0 pbw. Results indicate that the combinations of glycerine and foam modifier A can improve the cure of the foam, enhance physical properties (especially compression sets), reduce the tendency of the foam to shrink and improve the stability of the foam against a foam barrier in a fabric cover, while retaining minimal tendency to penetrate the foam barrier. Example A is a comparative Example made without the use of glycerine or other polyhydric material.

TABLE II

| Production of Poured-in-Place Foams Without Glycerine | | | |
|---|---|---|---|
| Examples | A | 1 | 2 |
| Polyol A | 55 | 55 | 55 |
| Polyol B | 45 | 45 | 45 |
| Water | 3.0 | 3.0 | 3.0 |
| DEOA | 2.0 | 2.0 | 2.0 |
| Glycerine | — | 0.5 | 1.0 |
| Foam modifier A | 0.5 | 0.5 | 1.0 |
| A-1 | 0.15 | 0.15 | 0.15 |
| A-33 | 0.70 | 0.75 | 0.75 |
| Y-10515 | 0.8 | 0.8 | 0.8 |
| TDI | 37.8 | 39.2 | 40.7 |
| Index | 100 | 100 | 100 |
| Foam Cure (Free rise) | | | |
| Tack Free Time, Minutes | >5 | 5:00 | 4:00 |
| Tendency to Shrink (Free Rise) | Yes | Slight | No |
| Pour-in-Fabric Cover | | | |
| Barrier Penetration: Min. Fill | 10 | 10 | 10 |
| %   10% Pack | 35 | 20 | 20 |
|     15% Pack | 40 | 35 | 25 |
| Foam Stability (Barrier Interface) | Very Poor | Poor | Fair |
| Foam Phys. Prop. (ASTM D-3574) Free Rise: (From Lilly Tub Reactivity) | | | |
| Core Density, lb/ft$^3$ | 2.75 | 2.61 | 2.56 |
| CFD, psi | 0.89 | 0.80 | 0.65 |
| 50% Comp. Set (CD) | 22.7 | 21.4 | 16.5 |
| 50% HACS (CD) | 34.78 | 39.5 | 31.9 |
| PIP Phys. Prop. (Avg. of Min. Fill, 10% and 15% Pack) | | | |
| Core Density, lb/ft$^3$ | 2.20 | 2.52 | 2.46 |
| CFD, psi | — | 0.73 | 0.62 |
| 50% C.S. (CD) | 18.4 | 14.0 | 13.4 |
| 50% HACS (CD) | 40.7 | 37.6 | 33.6 |

Legend, Foam Stability:
Good = No collapse
Fair = Few collapsed areas
Poor = Many collapsed areas

EXAMPLES B, 3, 4 AND 5

These Examples illustrate the effects of adding glycerine and optionally adding a foam modifier A to compositions based on 50 parts of polyol A and 50 parts of polyol B. Results indicate that addition of glycerine alone (Example 4) can improve foam cure, foam stability, foam stability and foam physical properties while retaining minimal tendency to penetrate a foam barrier and without having significant influence on foam shrinkage. Example B is a comparative example not of this invention since it employs no hydrophilic polyhydric material. Additional enhancement of foam cure and foam physical properties as well as reduction in foam shrinkage tendency can be conferred by combinations of glycerine and a foam modifier (Examples 3 and 5), while still retaining minimal tendency to penetrate a foam barrier. Note that the isocyanate used in all Examples herein is TDI, rather than MDI as used in prior composition attempts.

TABLE III

| Component, pbw | Pour-in-Place Flexible Foam Articles | | | | | | | |
| --- | --- | --- | --- | --- | --- | --- | --- | --- |
| | Example B | | Example 3 | | Example 4 | | Example 5 | |
| Polyol A | 50 | 50 | 50 | 50 | 50 | 50 | 50 | 50 |
| Polyol B | 50 | 50 | 50 | 50 | 50 | 50 | 50 | 50 |
| Water | 3.0 | 3.0 | 3.0 | 3.0 | 3.0 | 3.0 | 3.0 | 3.0 |
| Diethanolamine | 2.0 | 2.0 | 2.0 | 2.0 | 2.0 | 2.0 | 2.0 | 2.0 |
| Glycerine | — | — | 1.0 | 1.0 | 1.0 | 1.0 | 1.5 | 1.5 |
| Foam Modifier A | — | — | 1.0 | 1.0 | — | — | 1.0 | 1.0 |
| Catalyst A-1 | 0.15 | 0.15 | 0.15 | 0.15 | 0.15 | 0.15 | 0.15 | 0.15 |
| Catalyst A-33 | 0.75 | 0.75 | 0.75 | 0.75 | 0.65 | 0.65 | 0.65 | 0.65 |
| Surfactant Y-10,515 | 0.8 | 0.8 | 0.8 | 0.8 | 0.8 | 0.8 | 0.8 | 0.8 |
| TDI | 33.9 | 37.7 | 36.7 | 40.8 | 36.5 | 40.5 | 38.0 | 42.2 |
| Index | 90 | 100 | 90 | 100 | 90 | 100 | 90 | 100 |
| Foam Cure (Free Rise) | | | | | | | | |
| Tack Free Time, minutes | >5 | >5 | 3:10 | 4:00 | 4:00 | 4:45 | 3:00 | 4:30 |
| Tendency to Shrink (Free Rise) | V. slight | V. slight | V. slight | V. slight | Slight | Slight | No | No |
| Pour-in-Fabric Cover | | | | | | | | |
| Barrier Penetration: Min. Fill | 20 | 35 | 20 | 20 | 20 | 35 | 30 | 35 |
| %           10% Pack | 35 | 45 | 35 | 40 | 35 | 45 | 40 | 45 |
|             15% Pack | 50 | 55 | 50 | 50 | 50 | 55 | 50 | 55 |
| Foam Stability (Barrier Interface) | Fair | Poor | Good | Fair | Good | Good-Fair | Good | Good |
| Foam Physical Properties (ASTM D-3574) | | | | | | | | |
| Free Rise: (Cake Box Pour) | | | | | | | | |
| Core Density, pcg | 2.30 | 2.10 | 2.27 | 2.42 | 2.16 | 2.08 | 2.32 | 2.23 |
| CFD, psi | 0.42 | 0.45 | 0.44 | 0.48 | 0.47 | 0.52 | 0.48 | 0.57 |
| Tensile Strength, psi | 16.6 | 15.5 | 14.8 | 14.0 | 16.3 | 16.0 | 16.9 | 15.7 |
| Elongation, % | 116 | 95 | 110 | 91 | 104 | 91 | 100 | 85 |
| Tear Strength, pli | 0.82 | 0.87 | 0.82 | 1.00 | 0.79 | 0.81 | 0.75 | 0.75 |
| 50% Comp. Set. % (C.D.) | 13.8 | 12.8 | 7.7 | 9.1 | 11.8 | 10.9 | 10.6 | 13.0 |
| 50% H.A.C.S. % (C.D.) | 29.3 | 32.1 | 16.9 | 25.0 | 30.0 | 34.9 | 21.9 | 28.9 |
| P.I.P. (Avg. of Min. Fill, 10%, 15% Pack) | | | | | | | | |
| Core Density, pcf | 2.39 | 2.27 | 2.50 | 2.42 | 2.25 | 2.29 | 2.29 | 2.28 |
| CFD, psi | 0.44 | 0.49 | 0.58 | 0.62 | 0.54 | 0.69 | 0.57 | 0.65 |
| 50% Comp. Set. % (C.D.) | 14.5 | 16.1 | 10.8 | 12.2 | 11.2 | 11.5 | 11.2 | 12.0 |
| 50% H.A.C.S. % (C.D.) | 23.5 | 28.9 | 18.9 | 24.3 | 23.0 | 29.7 | 18.6 | 24.0 |

EXAMPLE 6—VINYL STAINING EXAMPLE

The foam composition from Example 4 was poured into a white vinyl coated fabric that is typical of that used in automotive trim applications. The fully encapsulated foam was subsequently exposed to 7 days at 80° C. in a forced air circulating oven. No discoloration or staining occurred when compared with a piece of cover stock exposed as a control.

Many modifications may be made in the pour-in-place polyurethane foams of this invention without departing from the spirit and scope thereof, which are defined only in the appended claims. For example, the exact proportions and ingredients of the components of the formulation may be modified to optimize it for certain applications or certain exterior covering materials.

We claim:

1. A process for the manufacture of a poured-in-place composite article having an exterior covering and a flexible polyurethane foam core comprising the steps of:
   containing the exterior covering in a shaped mold, where the exterior covering is an upholstery material;
   injecting into the shaped mold inside the exterior covering fluid reacting intermediates; and
   reacting together the fluid reacting intermediates which expand to conform the composite article to the shape of the shaped mold, where the fluid reacting intermediates comprise:
   (a) a polyether polyol having a nominal functionality of at least three, a primary hydroxyl content of at least 75 percent, and an ethylene oxide content of from 8 to 30 percent of the polyether polyol;
   (b) 0.1 to 10 parts per hundred parts (pphp) of polyol of a polyhydric material selected from the group consisting of glycerine, trimethylolpropane, sorbitol, erythritol, sucrose, simple carbohydrates, and mixtures thereof, said polyhydric material also being sufficiently hydrophilic so as to be at least 40 weight percent soluble in water at 25° C.;
   (c) water in an amount of less than or equal to 20 pphp of polyol;
   (d) an organic polyisocyanate;
   (e) at least one catalyst for the reaction of the polyether polyol with the organic polyisocyanate; and
   (f) a silicon stabilizer.

2. The process of claim 1 where the fluid reacting intermediates additionally comprise a crosslinker/chain extender having an average of at least two isocyanate reactive groups per molecule and an equivalent weight of less than about 200 and present in the fluid reacting intermediates in a range of about 0.1 to 10 pphp of the polyether polyol.

3. The process of claim 1 where the fluid reacting intermediates additionally comprise a high ethylene oxide containing process/foam modifier present in the fluid reacting intermediates in a range of about 0.1 to 10 pphp of the polyether polyol.

4. The process of claim 3 where the process/foam modifier is an ethylene oxide adduct having greater than about 50% ethylene oxide and having an equivalent weight ranging from about 150 to about 5000.

5. The process of claim 1 where the polyhydric material is glycerine.

6. The process of claim 1 where the polyhydric material is employed in an amount equal to 0.5 to 5 pphp of polyol.

7. The process of claim 1 where the water level employed ranges from 1.5 to 5 pphp of polyol.

8. The process of claim 1 where the organic polyisocyanate is selected from the group of polyisocyanates consisting of TDI, MDI or a mixture thereof.

9. The process of claim 1 further comprising the step of placing a barrier film behind the exterior covering prior to the injection of the mixture into the mold behind the barrier film.

10. The process of claim 1 in the absence of any step adding a halocarbon blowing agent.

11. A poured-in-place composite article manufactured by the process of claim 1.

12. A process for the manufacture of a poured-in-place composite article having an exterior covering and a flexible polyurethane foam core comprising the steps of:
    containing the exterior covering in a shaped mold, where the exterior covering is an upholstery material;
    injecting into the shaped mold inside the exterior covering fluid reacting intermediates; and
    reacting together the fluid reacting intermediates which expand to conform the composite article to the shape of the shaped mold, where the fluid reacting intermediates comprise:
    (a) a polyether polyol having a nominal functionality of at least three, a primary hydroxyl content of at least 75 percent, and an ethylene oxide content of from 8 to 30 percent of the polyether polyol;
    (b) 0.5 to 5 parts per hundred parts (pphp) of glycerine;
    (c) water in an amount of from about 1.5 to 5 pphp of polyol;
    (d) an organic polyisocyanate;
    (e) 0.001 to 5 percent, based on the total weight of the fluid reacting intermediates, of at least one catalyst for the reaction of the polyether polyol with the organic polyisocyanate; and
    (f) a silicon stabilizer.

13. The process of claim 12 where the fluid reacting intermediates additionally comprise a crosslinker/chain extender having an average of at least two isocyanate reactive groups per molecule and an equivalent weight of less than about 200 and present in the fluid reacting intermediates in a range of about 0.1 to 10 pphp of the polyether polyol.

14. The process of claim 12 where the fluid reacting intermediates additionally comprise a high ethylene oxide containing process/foam modifier present in the fluid reacting intermediates in a range of about 0.1 to 10 pphp of the polyether polyol.

15. The process of claim 14 where the process/foam modifier is an ethylene oxide adduct having greater than about 50% ethylene oxide and having an equivalent weight ranging from about 150 to about 5000.

16. The process of claim 12 where the organic polyisocyanate is selected from the group of polyisocyanates consisting of TDI, MDI or a mixture thereof.

17. The process of claim 12 further comprising the step of placing a barrier film behind the exterior covering prior to the injection of the mixture into the mold behind the barrier film.

18. A poured-in-place composite article manufactured by the process of claim 12.

19. A process for the manufacture of a poured-in-place composite article having an exterior covering and a flexible polyurethane foam core comprising the steps of:
    containing the exterior covering in a shaped mold, where the exterior covering is an upholstery material;
    injecting into the shaped mold inside the exterior covering fluid reacting intermediates; and
    reacting together the fluid reacting intermediates which expand to conform the composite article to the shape of the shaped mold, where the fluid reacting intermediates comprise:
    (a) a polyether polyol having a nominal functionality of at least three, a primary hydroxyl content of at least 75 percent, and an ethylene oxide content of from 8 to 30 percent of the polyether polyol;
    (b) 0.5 to 5 parts per hundred parts (pphp) of glycerine;
    (c) water in an amount of from about 1.5 to 5 pphp of polyol;
    (d) an organic polyisocyanate selected from the group of polyisocyanates consisting of TDI, MDI and mixtures thereof;
    (e) 0.001 to 5 percent, based on the weight of (a), (b), (c), (d) and (e) of at least one catalyst for the reaction of the polyether polyol with the organic polyisocyanate;
    (f) a silicon stabilizer; and
    (g) a high ethylene oxide containing process/foam modifier in the fluid reacting intermediates in a range of about 0.1 to 10 pphp of the polyether polyol, where the process/foam modifier is an ethylene oxide adduct having greater than about 50% ethylene oxide and having an equivalent weight ranging from about 150 to about 5000.

20. The process of claim 19 where the process/foam modifier is an ethylene oxide adduct of glycerine.

21. The process of claim 19 where the fluid reacting intermediates additionally comprise a crosslinker/chain extender having an average of at least two isocyanate reactive groups per molecule and an equivalent weight of less than about 200 and present in the fluid reacting intermediates in a range of about 0.1 to 10 pphp of the polyether polyol.

22. A molded, poured-in-place, composite article manufactured by the process of claim 19.

* * * * *